US012266297B1

(12) United States Patent
Zhong et al.

(10) Patent No.: US 12,266,297 B1
(45) Date of Patent: Apr. 1, 2025

(54) DISPLAY PANEL AND DISPLAY DEVICE

(71) Applicant: Xiamen Tianma Display Technology Co., Ltd., Xiamen (CN)

(72) Inventors: Hui Zhong, Xiamen (CN); Jinjin Yang, Xiamen (CN); Jun Li, Xiamen (CN); Zhihua Yu, Xiamen (CN); Kangpeng Yang, Xiamen (CN); Shuang Zou, Xiamen (CN); Hai Yin, Xiamen (CN); Haibo Zhang, Xiamen (CN); Jin Guo, Xiamen (CN); Haichao Lu, Xiamen (CN); Zhengyu Ye, Xiamen (CN); Wenchun Chen, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/633,286

(22) Filed: Apr. 11, 2024

(30) Foreign Application Priority Data

Jan. 16, 2024 (CN) ........................ 202410063101.7

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2320/0233* (2013.01); *G09G 2330/021* (2013.01)

(58) Field of Classification Search
CPC ............. G09G 3/32; G09G 2310/0267; G09G 2310/0275; G09G 2320/0233; G09G 2330/021
See application file for complete search history.

(56) References Cited

U.S. PATENT DOCUMENTS

2011/0175858 A1* 7/2011 Lee ...................... G09G 3/3688 345/204
2021/0209979 A1* 7/2021 Gao ..................... G09G 3/2092
2023/0267877 A1* 8/2023 Wei ...................... G09G 3/3233 345/55
2024/0194103 A1* 6/2024 Hwang .................... G09G 3/32

FOREIGN PATENT DOCUMENTS

CN 108694907 A 10/2018
CN 115620677 A 1/2023

* cited by examiner

*Primary Examiner* — Andrew Sasinowski

(74) *Attorney, Agent, or Firm* — Anova Law Group, PLLC

(57) ABSTRACT

A display panel and a display device are provided. The display panel includes circuit rows and pixel circuit columns arranged as an array. Each pixel circuit row includes a first pixel circuit and a second pixel circuit, the first pixel circuit is electrically connected to a first scan line and the second pixel circuit is electrically connected to a second scan line; first pixel circuits in a same column are electrically connected to the first data line, and second pixel circuits in a same column are electrically connected to the second data line; and a first scan signal on the first scan line is configured to control whether a first data signal is written to the first pixel circuit, and a second scan signal on the second scan line is configured to control whether a second data signal is written to the second pixel circuit.

20 Claims, 10 Drawing Sheets

DISPLAY PANEL AND DISPLAY DEVICE

CROSS-REFERENCE TO RELATED APPLICATION

This application claims the priority of Chinese Patent Application No. 202410123675.9, filed on Jan. 29, 2024, the content of which is incorporated by reference in its entirety.

TECHNICAL FIELD

The present disclosure generally relates to the field of display technologies and, more particularly, relates to a display panel and a display device.

BACKGROUND

With the continuous updating of display technologies, users have higher and higher requirements for the display effect of display products. However, there is still a need to improve the display effect of the display panel during use. For example, the pixel circuits in the same row of a display panel are all electrically connected to the same scan line, the scan line is used to control the first data signal on the first data line to be written into a portion of the pixel circuits in the same row, and control the second data signal on the second data line to be written to another portion of the pixel circuit in the same row in a time-share manner. Accordingly, the charging time of the pixel circuit is relatively short, resulting in insufficient charging of the pixel circuit, and the display effect of the display panel is affected. The present disclosed display panels and display devices are direct to improve the display effect of the display panel and to solve other problems in the arts.

SUMMARY

One aspect of the present disclosure provides a display panel. The display panel includes a plurality of pixel circuit rows and a plurality of pixel circuit columns arranged as an array. Each of the plurality of pixel circuit rows includes a first pixel circuit and a second pixel circuit, the first pixel circuit is electrically connected to a first scan line and the second pixel circuit is electrically connected to a second scan line; first pixel circuits in a same column of the plurality of pixel circuit columns are electrically connected to the first data line, and second pixel circuits in a same column of the plurality of pixel circuit columns are electrically connected to the second data line; and a first scan signal on the first scan line is configured to control whether a first data signal on the first data line is written to the first pixel circuit, and a second scan signal on the second scan line is configured to control whether a second data signal on the second data line is written to the second pixel circuit.

Another aspect of the present disclosure includes providing a display device. The display device includes a display panel. The display panel includes a plurality of pixel circuit rows and a plurality of pixel circuit columns arranged as an array. Each of the plurality of pixel circuit rows includes a first pixel circuit and a second pixel circuit, the first pixel circuit is electrically connected to a first scan line and the second pixel circuit is electrically connected to a second scan line; first pixel circuits in a same column of the plurality of pixel circuit columns are electrically connected to the first data line, and second pixel circuits in a same column of the plurality of pixel circuit columns are electrically connected to the second data line; and a first scan signal on the first scan line is configured to control whether a first data signal on the first data line is written to the first pixel circuit, and a second scan signal on the second scan line is configured to control whether a second data signal on the second data line is written to the second pixel circuit.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Figure 1:
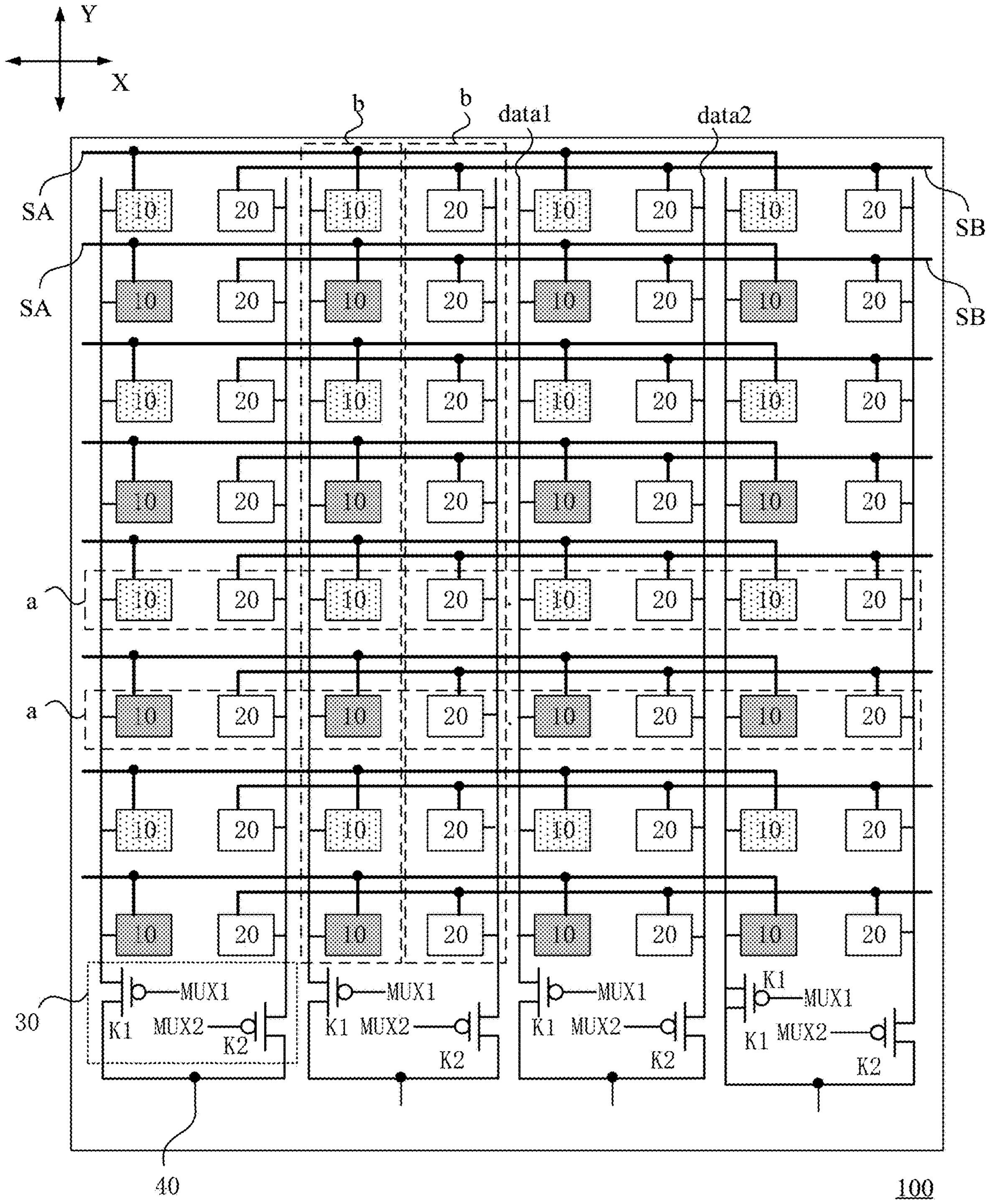
FIG. 1 illustrates an exemplary display panel according to various disclosed embodiments of the present disclosure.

Features and exemplary embodiments of various aspects of the present disclosure will be described in detail below. To make the purpose, technical solutions and advantages of the present disclosure clearer, the present disclosure will be described in further detail below with reference to the accompanying drawings and specific embodiments. It should be understood that the specific embodiments described herein are only configured to explain the present disclosure and are not configured to limit the present disclosure. It will be apparent to one skilled in the art that the present disclosure may be practiced without some of these specific details. The following description of embodiments is merely intended to provide a better understanding of the present disclosure by illustrating examples thereof.

It should be noted that in this article, relational terms such as “first” and “second” are only used to distinguish one entity or operation from another entity or operation, and do not necessarily require or imply that these entities or operations have any such actual relationship or sequence exists between them. Furthermore, the terms “comprises”, “includes”, or any other variations thereof are intended to cover a non-exclusive inclusion such that a process, method, article, or apparatus that includes a list of elements includes not only those elements, but also those not expressly listed other elements, or elements inherent to the process, method, article or equipment. Without further limitation, an element defined by the statement “comprising . . . ” does not exclude the presence of additional identical elements in a process, method, article, or device that includes the stated element.

It should be understood that the term “and/or” used in this article is only an association relationship describing related objects, indicating that there can be three relationships, for example, A and/or B, which can mean: A alone exists, and A and B exist simultaneously, and B alone. In addition, the character “/” in this article generally indicates that the related objects are an “or” relationship.

In the embodiments of this disclosure, the term “electrical connection” may refer to a direct electrical connection between two components, or may refer to an electrical connection between two components via one or more other components.

It will be apparent to those skilled in the art that various modifications and changes can be made in this disclosure without departing from the spirit or scope of the disclosure. Thus, this disclosure is intended to cover the modifications and variations of this disclosure provided they come within the scope of the corresponding claims (claimed technical solutions) and their equivalents. It should be noted that the implementation modes provided in the embodiments of this disclosure can be combined with each other if there is no contradiction.

The present disclosure provides a display panel and a display device. Each embodiment of the display panel and the display device will be described below with reference to the accompanying drawings.

FIG. 1 illustrates an exemplary display panel according to various disclosed embodiments of the present disclosure. The display panel may be an organic light-emitting diode (OLED) display panel or other display panel.

As shown in FIG. 1, the display panel 100 may include a plurality of pixel circuit rows a and a plurality of pixel circuit columns b arranged as an array. The plurality of pixel circuit rows a may be arranged in a column direction Y, and the plurality of pixel circuit columns b may be arranged in the row direction X. Each pixel circuit row a may include a first pixel circuit 10 and a second pixel circuit 20. The first pixel circuit 10 may be electrically connected to a first scan line SA, and the second pixel circuit 20 may be electrically connected to a second scan line SB.

The first pixel circuits 10 in a same column may be electrically connected to a first data line data1, and the second pixel circuits 20 in a same column may be electrically connected to a second data line data2. The first data line data1 may be configured to transmit a first data signal on the first data line data1 to the first pixel circuit 10, and the second data line data2 may be configured to transmit a second data signal on the second data line data2 to the second pixel circuit 20.

The first scan signal on the first scan line SA may be used to control whether the first data signal on the first data line data1 is written to the first pixel circuit 10, and the second scan signal on the second scan line SB may be used to control whether the second data signal on the first data line data1 is written to the second pixel circuit 20. Specifically, when the first scan signal is at the on-level, the first data signal on the first data line data1 may be controlled to be written into the first pixel circuit 10; when the first scan signal is at the off-level, the first data signal on the first data line data1 may be controlled not to be written into the first pixel circuit 10; when the second scan signal is at an on-level, the second data signal on the second data line data2 may be controlled to be written into the first pixel circuit 10; and when the second scan signal is at the off-level, the second data signal on the second data line data2 may be controlled not to be written into the first pixel circuit 10.

The first pixel circuit 10 and the second pixel circuit 20 may be electrically connected to different light-emitting elements. The first pixel circuit 10 may generate a driving current according to the first data signal to drive the corresponding light-emitting element of the first pixel circuit 10 to emit light. The second pixel circuit 20 may generate a driving current according to the second data signal to drive the corresponding light-emitting element of the second pixel circuit 20 to emit light.

In one embodiment of the present disclosure, the first pixel circuit 10 may be electrically connected to the first scan line SA, and the second pixel circuit 20 may be electrically connected to the second scan line SB. Accordingly, the duration for writing the first data signal on the first data line data1 to the first pixel circuit 10 may be flexibly controlled; and the duration for writing the second data signal on the second data line data2 to the second pixel circuit 20 may be flexibly controlled. For example, by adding a new scan line, the charging time of the first pixel circuit 10 and the second pixel circuit 20 may be controlled independently, and the charging time of the first pixel circuit 10 and/or the second pixel circuit 20 may be flexibly controlled, which may be conducive to increasing the charging time of the first pixel circuit 10 and/or the second pixel circuit 20, and thereby may be conducive to solving the short charging time issue of the first pixel circuit 10 and/or the second pixel circuit 20 which causes the first pixel circuit 10 and/or the second pixel circuit 20 to be insufficiently charged. Accordingly, the display effect of the display panel may be improved.

It can be understood that in one embodiment of the present disclosure, each pixel circuit row a may be electrically connected to the first scan line SA and the second scan line SB, which may be named as an eMUX architecture, which may mean that circuits with a same multiplexer (MUX) function in the display panel may be integrated inside the driver chip (IC).

In some embodiments, as shown in FIG. 1, the first pixel circuit 10 in the pixel circuit row a may be adjacent to the second pixel circuit 20. For example, the first pixel circuit 10 may include pixel circuits located in odd-numbered columns in the pixel circuit row a, and the second pixel circuit 20 may include pixel circuits located in even-numbered columns in the pixel circuit row a.

In some embodiments, the n-th first pixel circuit 10 in the same pixel column may be configured to drive a light-emitting element of a first color, and the (n+1)-th first pixel circuit 10 in the same pixel column may be configured to drive a light-emitting element of a second color. The second pixel circuit 20 may be configured to drive a light-emitting element of a third color. n may be a positive integer. In one embodiment, the first color may be red, the second color may be blue, and the third color may be green.

In some embodiments, as shown in FIG. 1, n may be an odd number. For the odd-numbered pixel circuit column b, the first pixel circuit 10 in the odd-numbered row may be configured to drive the red light-emitting element, and the first pixel circuit 10 in the even-numbered row may be configured to drive the blue light-emitting element. For the even-numbered pixel circuit column b, the second pixel circuit 20 may be configured to drive the green light-emitting element.

In other words, for the odd-numbered pixel circuit row a, the first pixel circuit 10 for driving the red light-emitting element and the second pixel circuit 20 for driving the green light-emitting element may be alternately arranged in the row direction X. For the even-numbered pixel circuit row a, the first pixel circuit 10 for driving the blue light-emitting element and the second pixel circuit 20 for driving the green light-emitting element may be alternately arranged in the row direction X. The value of n may be set according to the actual situation and is not limited here.

In some embodiments, as shown in FIG. 1, the display panel 100 may further include a gating circuit 30, and the gating circuit 30 may include a first switch K1 and a second switch K2. The first terminal of the first switch K1 and the first terminal of the second switch K2 may be both electrically connected to the same data signal terminal 40. The second terminal of the first switch K1 may be electrically connected to the first data line data1, and the second terminal of the second switch K2 may be electrically connected to the second data line data2. The first data line data1 may be adjacent to the second data line data2.

In one embodiment, by controlling the conduction of the first switch K1 and the second switch K2, the first data signal on the first data line data1 may be controlled to be written into the first pixel circuit 10 at a specific time, and the second data signal on the second data line data2 may be controlled to be written into the second pixel circuit 20 at a specific time.

In one embodiment, the gating circuit 30 may be provided corresponding to the pixel circuit column b. For example, if the gating circuit 30 includes two switches, the number of the gating circuits 30 may be equal to ½ of the number of pixel circuit columns b.

It can be understood that, in the display panel provided by the embodiment of the present disclosure, by electrically connecting the first pixel circuit 10 to the first scan line SA and electrically connecting the second pixel circuit 20 to the second scan line SB, the duration during which the first data signal on the first data line data1 is written into the first pixel circuit 10 may be flexibly controlled, and the duration during which the second data signal on the second data line data2 is written into the second pixel circuit 20 may be flexibly controlled. Compared with the MUX area of double data lines (DDL), the number of potential level switching may be reduced, and the power consumption of the display panel may be reduced.

In some embodiments, the gating circuit 30 may be electrically connected with the first control signal line MUX1 and the second control signal line MUX2. For example, the control terminal of the first switch K1 may be electrically connected to the first control signal line MUX1, and the control terminal of the second switch K2 may be electrically connected to the second control signal line MUX2. The first switch K1 may be controlled by the first control signal line MUX1 to be turned on or off. The second switch K2 may be turned on or off under the control of the second control signal line MUX2. The first switch K1 and the second switch K2 may be turned on or off under the control of the first control signal line MUX1 and the second control signal line MUX2 in sequence, respectively.

The first control signal line MUX1 may be used to control whether the first data signal from the data signal terminal 40 is written to the first data line data1, and the second control signal line MUX2 may be used to control whether the second data signal from the data signal terminal 40 is written to the second data line data2.

Specifically, when the control signal of the first control signal line MUX1 is at the on-level, the first switch K1 may be turned on, and the first data signal of the data signal terminal 40 may be written into the first data line data1. When the control signal of the first control signal line MUX1 is at the off-level, the first switch K1 may be turned off, and the first data signal of the data signal terminal 40 may not be written to the first data line data1. When the control signal of the second control signal line MUX2 is at the on-level, the second data signal of the data signal terminal 40 may be written into the second data line data2. When the control signal of the second control signal line MUX2 is at the off-level, the second data signal of the data signal terminal 40 may not be written to the second data line data2. In each embodiment of the present disclosure, the conduction level is a low-level as an example for description, in actual implementation, the conduction level may also be a high-level.

Figure 2:
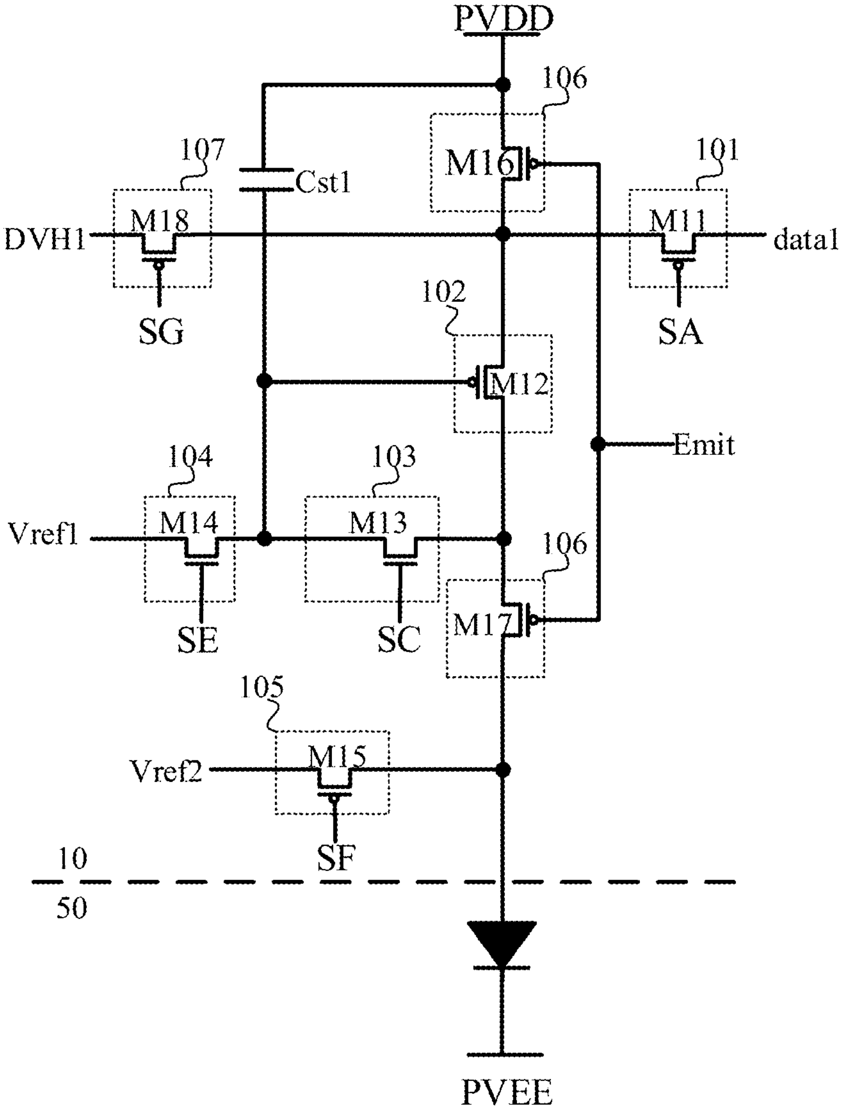
FIG. 2 illustrates a first pixel circuit of an exemplary display panel according to various disclosed embodiments of the present disclosure.
Figure 3:
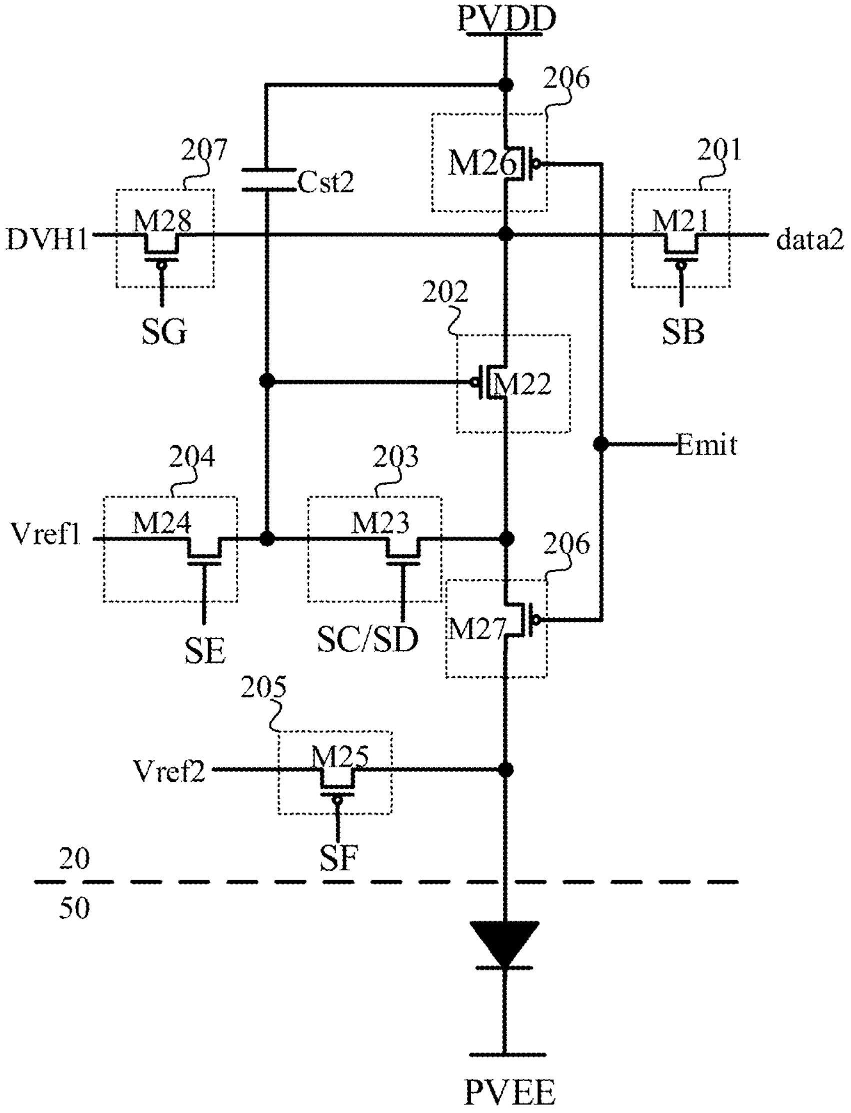
FIG. 3 illustrates a second pixel circuit of an exemplary display panel according to various disclosed embodiments of the present disclosure.

It can be understood that the control signals on the first control signal line MUX1 and the second control signal line MUX2 are at the on-levels in sequence. For example, both the first switch K1 and the second switch K2 may be transistors. As shown in FIG. 2, the first pixel circuit 10 may include a first data writing module 101 and a first driving module 102. The first data writing module 101 may be electrically connected to the first scan line SA. The first data writing module 101 may be used to transmit the first data signal to the first driving module 102. As shown in FIG. 3, the second pixel circuit 20 may include a second data writing module 201 and a second driving module 202. The second data writing module 201 may be electrically connected to the second scan line SB. The second data writing module 201 may be configured to transmit the second data signal to the second driving module 202. For example, the first data writing module 101 may be turned on or off under the control of the first scan signal on the first scan line SA, and the second data writing module 201 may be turned on or off under the control of the second scan signal on the second scan line SB.

Within the display time of one frame, the operation process of the first pixel circuit 10 may include a first data writing stage, and the operation process of the second pixel circuit 20 may include a second data writing stage. In the first data writing stage, the first data writing module 101 may be turned on, and the first data signal on the first data line data1 may be written into the first driving module 102. In the second data writing stage, the second data writing module 201 may be turned on, and the second data signal on the second data line data2 may be written into the second driving module 202.

As shown in FIG. 2, the first pixel circuit 10 may further include a first threshold compensation module 103. The first threshold compensation module 103 may be electrically connected between the control terminal of the first driving module 102 and the first terminal of the first driving module 102. The first threshold compensation module 103 may be used to perform a threshold compensation on the first driving module 102.

As shown in FIG. 3, the second pixel circuit 20 may further include a second threshold compensation module 203. The second threshold compensation module 203 may be electrically connected between the control terminal of the second driving module 202 and the first terminal of the second driving module 202. The second threshold compensation module 203 may be used to perform a threshold compensation on the second driving module 202.

In some embodiments, the first threshold compensation module 103 of the first pixel circuit 10 and the second threshold compensation module 203 of the second pixel circuit 20 may be both electrically connected to the third scan line SC. In such a configuration, the number of scan lines may be reduced, which may be beneficial to saving costs and achieving high pixel density.

Both the first threshold compensation module 103 of the first pixel circuit 10 and the second threshold compensation module 203 of the second pixel circuit 20 may be turned on or off under the control of the third scan line SC. Specifically, when the scan signal on the third scan line SC is at the on-level, both the first threshold compensation module 103 and the second threshold compensation module 203 may be on, and when the scan signal on the third scan line SC is at an off-level, both the first threshold compensation module 103 and the second threshold compensation module 203 may be turned off.

As shown in FIG. 2, the first pixel circuit 10 may further include a first reset module 104, a second reset module 105, a first light-emitting control module 106, a first bias module 107 and a storage capacitor Cst1. The first reset module 104 may be configured to provide a reset signal on the reset signal line Vref1 to the control terminal of the first driving module 102 under the control of the scan line SE. The second reset module 105 may be configured to provide a reset signal on the reset signal line Vref2 to the light-emitting element 50 under the control of the scan line SF. The first light-emitting control module 106 may be used to control the light-emitting element 50 to emit light under the control of the light-emitting control signal line Emit. The first bias module 107 may be used to provide a bias signal to the first driving module 102 under the control of the scan line SG. The first power line PVDD may provide a positive voltage, and the second power line PVEE may provide a negative voltage. The specific connection relationship of each module and the included transistors may be referred to FIG. 2, which will not be described in detail here.

As shown in FIG. 3, the second pixel circuit 20 may further include a third reset module 204, a fourth reset module 205, a second light-emitting control module 206, a second bias module 207 and a storage capacitor Cst2. The third reset module 204 may be configured to provide a reset signal on the reset signal line Vref1 to the control terminal of the second driving module 202 under the control of the scan line SE. The fourth reset module 205 may be configured to provide a reset signal on the reset signal line Vref2 to the light-emitting element 50 under the control of the scan line SF. The second light-emitting control module 206 may be used to control the light-emitting element 50 to emit light under the control of the light-emitting control signal line Emit. The second bias module 207 may be used to provide a bias signal to the second driving module 202 under the control of the scan line SG. The specific connection relationship of each module and the included transistors may be referred to FIG. 3, and will not be described in detail here.

Figure 4:
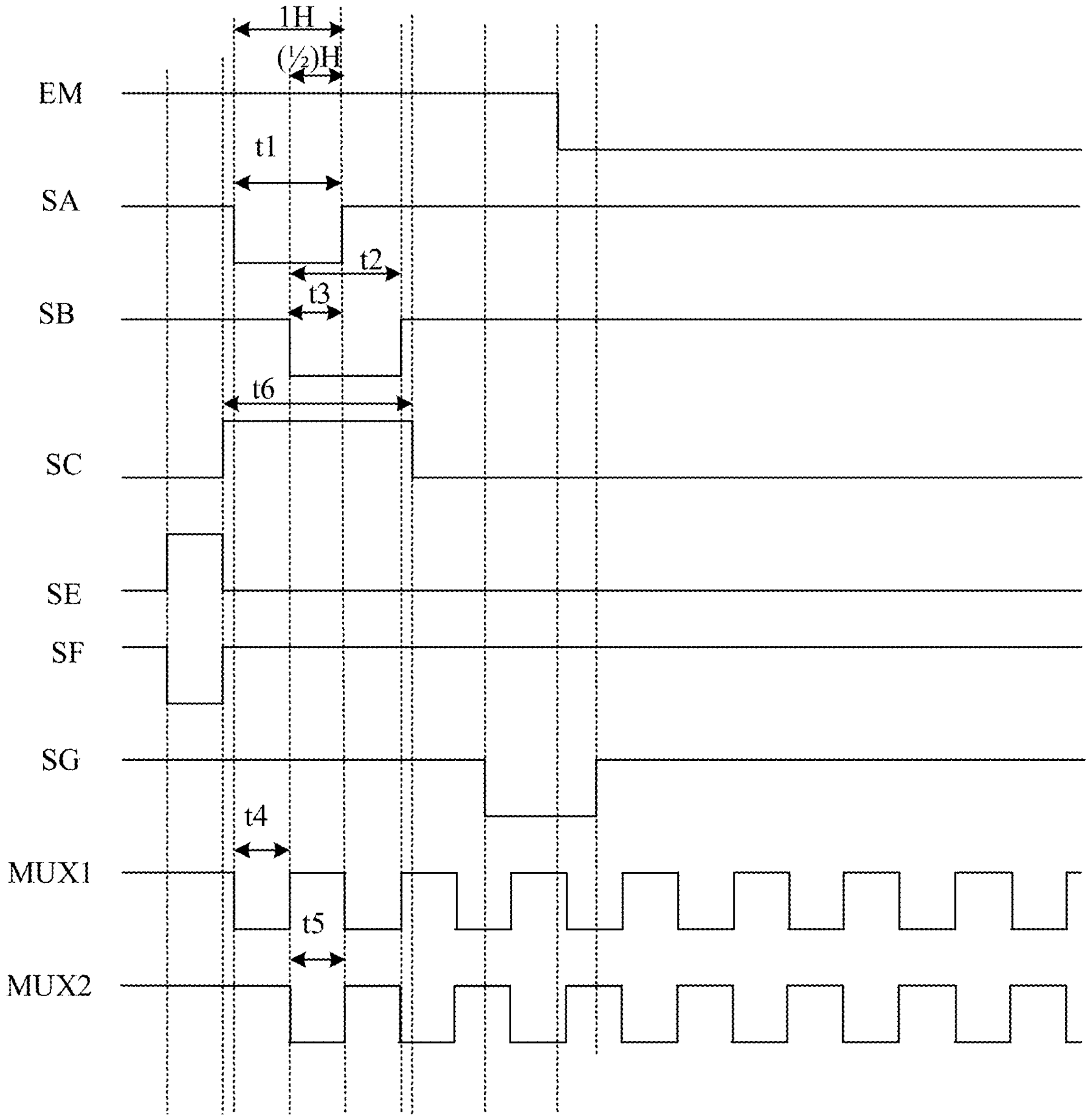
FIG. 4 illustrates a time sequence of an exemplary display panel according to various disclosed embodiments of the present disclosure.

In some embodiments, as shown in FIGS. 2-4, the durations during which the first scan signal on the first scan line SA is at the on-level and the second scan signal on the second scan line SB is at the on-level may at least partially overlap.

The duration when the first scan signal on the first scan line SA is at the on-level may be first data writing stage of the first pixel circuit 10. The duration when the second scan signal on the second scan line SB is at the on-level may be the second data writing stage of the second pixel circuit 20. Accordingly, the first data writing stage and the second data writing stage may at least partially overlap.

In such a configuration, while the first driving module 102 of the first pixel circuit 10 writes the first data signal, the second driving module 202 of the second pixel circuit 20 may also write the second data signal. Compared with the situation where the second driving module of the second pixel circuit writes the second data signal and the first driving module of the first pixel circuit 10 does not write the second data signal, the duration for writing the first data signal by the first driving module 102 in the first pixel circuit 10 may be increased. Alternatively, compared with the situation when the first driving module of the first pixel circuit writes the first data signal but the second driving module of the second pixel circuit does not write the second data signal, the duration for writing the second data signal to the second pixel circuit 20 may also be increased. For example, the charging time of the second pixel circuit 20 may be increased. In this way, it may be helpful to improve or solve the problem that the charging time of the first pixel circuit 10 and/or the second pixel circuit 20 is too short, resulting in insufficient charging of the first pixel circuit 10 and/or the second pixel circuit 20. Accordingly, the display effect of the display panel may be improved.

In some embodiments, the duration during which the first scan signal on the first scan line SA is at the on-level may be t1, and (½) H≤t1≤H. H may be the row scan time of the display panel. By controlling the duration t1 of the first scan signal to be at the on-level to be greater than ½ of the row scan time and less than or equal to the row scan time, the duration for the first driving module 102 of the first pixel circuit 10 to write the first data signal may be controlled to be greater than ½ of the row scan time and less than or equal to the row scan time. That is, the charging time of the first pixel circuit 10 may be controlled to be greater than ½ of the row scan time and less than or equal to the row scan time. Compared with the charging time of the first pixel circuit, which is less than or equal to ½ of the row scan time, the charging time of the first pixel circuit 10 may be increased, which may be beneficial to improving or solving the problem of the short charging time of the first pixel circuit 10 causing the pixel circuit 10 to be insufficiently charged and the display effect of the display panel needs to be improved. Accordingly, the display effect of the display panel may be improved.

The row scanning time may be the scanning duration of one row of pixel circuits in the display panel. For example, the duration during which the first driving module 102 of the first pixel circuit 10 writes the first data signal may be the line scanning time, that is, the charging time of the first pixel circuit 10 may be the line scanning time.

In some embodiments, the duration during which the second scan signal on the second scan line SB is at the on-level may be t2, and (½) H<t2≤H.

In one embodiment, by controlling the duration t1 of the second scan signal to be at the on-level to be greater than ½ row scanning time and less than or equal to the row scan time, the duration for the second driving module 202 of the second pixel circuit 20 to write the second data signal may be controlled to be greater than ½ row scan time and less than or equal to the row scan time. That is, the charging time of the second pixel circuit 20 may be controlled to be greater than ½ row scan time and less than or equal to the row scan time. Compared with the charging time of the second pixel circuit less than or equal to ½ row scanning time, the charging time of the second pixel circuit 20 may be increased, which may be beneficial to improving or solving the problem of the short charging time of the second pixel circuit 20 generating the issue that the second pixel circuit 20 is insufficiently charged and the display effect of the display panel needs to be improved. Accordingly, the display effect of the display panel may be improved.

In some embodiments, t1=t2. That is, the charging time of the first pixel circuit 10 may be equal to the charging time of the second pixel circuit 20, which may be beneficial to simplifying the control sequence and improving display uniformity. In some embodiments, the overlapping duration of the first scan signal on the first scan line SA and the second scan signal on the second scan line SB may be t3, t3=(½) H, and t1=t2=H.

In this embodiment, the overlapping duration of the first scan signal and the second scan signal may be controlled to be ½ row scan time; and the duration of the first scanning signal at the on-level and the duration of the second scanning signal at the on-level may be both the row scan time. That is, the duration for the first driving module 102 of the first pixel circuit 10 to write the first data signal and the duration for the second driving module 202 of the second pixel circuit 20 to write the second data signal may be both the row scan time. That is, the charging time of the first pixel circuit 10 and the second pixel circuit 20 may be both the row scan time. Compared with the charging time of the first pixel circuit and the charging time of the second pixel circuit in the related art, both of which are less than or equal to ½ row scan time, the charging time of the first pixel circuit 10 and the second pixel circuit 20 may be further increased, which may be conducive to further solving the problem that the charging time of the first pixel circuit 10 and the second pixel circuit 20 is too short, resulting in the first pixel circuit 10 and the second pixel circuit 20 being insufficiently charged, and the display effect of the display panel needs to be improved. Accordingly, the display effect of the display panel may be improved.

That is to say, the duration during which the second driving module 202 of the second pixel circuit 20 writes the second data signal may be the row scan time, that is, the charging time of the second pixel circuit 20 may be the line scanning time.

In some embodiments, referring to FIGS. 2-4, the duration during which the third scan signal on the third scan line SC is at the on-level may cover the duration during which the first scan signal on the first scan line SA is at the on-level, and may cover the duration in which the second scan signal on the second scan line SB is at the on-level.

In one embodiment, by controlling the duration during which the third scan signal is at the on-level to cover the duration during which the first scan signal is at the on-level, and to cover the duration during which the second scan signal is at the on-level, the first scan signal may be controlled to be at the on-level, the first driving module 102 of the pixel circuit 10 may write the first data signal while realizing the threshold compensation of the first driving module 10, and the second driving module 202 of the second pixel circuit 20 may write the second data signal while realizing the second threshold compensation of the second driving module 202.

For example, the duration during which the third scan signal on the third scan line SC is at the on-level may be t6, and t1+t2≤t6.

Referring to FIG. 1, FIG. 2 and FIG. 4, the duration during which the first scan signal on the first scan line SA is at the on-level and the duration during which the first control signal on the first control signal line MUX1 is at the on-level may at least partially overlap.

During the duration when the first scan signal on the first scan line SA is at the on-level and the first control signal on the first control signal line MUX1 is at the on-level, the first switch K1 and the first data writing module 101 may all be turned on, and the first data signal from the data signal terminal 40 may be written into the first driving module 102 through the first data line data1 and the first data writing module 101. During the duration when the first scan signal on the first scan line SA is at the on-level and the first control signal on the first control signal line MUX1 is at the off-level, the first switch K1 may be turned off and the first data writing module 101 may be turned on. At this time, the data signal terminal 40 may stop transmitting the first data signal to the first data line data1. Because the first data signal previously transmitted by the data signal terminal 40 may still exist on the first data line data1, the first data signal may still be written into the first driving module 102 through the first data writing module 101.

Referring to FIG. 1, FIG. 3 and FIG. 4, the duration during which the second scanning signal on the second scanning line SB is at the on-level and the second control signal on the second control signal line MUX2 is at the on-level may at least partially overlap.

During the duration when the second scan signal on the second scan line SB is at the on-level and the second control signal on the second control signal line MUX2 is at the on-level, the second switch K2 and the second data writing module 201 may all be turned on, and the second data signal from the data signal terminal 40 may be written into the second driving module 202 through the second data line data2 and the second data writing module 201. During the duration when the second scan signal on the second scan line SB is at the on-level and the second control signal on the second control signal line MUX2 is at the off-level, the second switch K2 may be turned off and the second data writing module 201 may be turned on. At this time, the data signal terminal 40 may stop transmitting the second data signal to the second data line data2. Because the second data signal previously transmitted by the data signal terminal 40 may still exist on the second data line data2, the second data signal may still be written into the second driving module 202 through the second data writing module 201.

Referring to FIG. 1, FIG. 2 and FIG. 4, in some embodiments, the duration during which the first scan signal on the first scan line SA is at the on-level may cover the duration during which the first control signal on the first control signal line MUX1 is at the on-level, and the duration during which the second control signal on the second control signal line MUX2 is at the on-level.

In one embodiment, by controlling the duration during which the first scan signal is at the on-level to cover the duration during which the first control signal is at the on-level, and cover the duration during which the second control signal is at the on-level, during the duration when the first control signal is at the off-level and the first scanning signal is at the on-level, the first driving module 102 of the first pixel circuit 10 may continue to write the first data signal. That is to say, the on-time of the first data writing module 101 in the first pixel circuit 10 may be further extended to further extend the time for the first driving module 102 in the first pixel circuit 10 to write the first data signal. Accordingly, the charging time of the first pixel circuit 10 may be further increased, which may be helpful to solve the problem of short charging time of the first pixel circuit 10, causing insufficient charging of the first pixel circuit 10 and the display effect of the display panel needs to be improved. Accordingly, the display effect of the display panel may be improved.

In one embodiment, the first control signal and the second control signal may be at the on-level in sequence.

As shown in FIG. 4, in some embodiments, the duration during which the first control signal on the first control signal line MUX1 is at the on-level may be equal to the duration during which the second control signal on the second control signal line MUX2 is at the on-level.

In one embodiment, by controlling the duration during which the first control signal is at the on-level to be equal to the duration during which the second control signal is at the on-level, the duration for the data signal terminal 40 to transmit the first data signal to the first data line data1 may be controlled to be same as the duration for the data signal terminal 40 to transmit the second data signal to the second data line data2, which may be beneficial to simplifying the control sequence and improving the uniformity of the display panel.

In some embodiments, the duration during which the first control signal on the first control signal line MUX1 is at the on-level may be t4, and the duration during which the second control signal on the second control signal line MUX2 is at the on-level may be t5, and t4=t5=(½) H. H may be the row scan time of the display panel.

In this embodiment, by controlling the duration during which the first control signal is at the on-level and the duration during which the second control signal is at the on-level are both ½ the row scan time, that is, when the duration for the data signal terminal 40 to transmit the first data signal to the first data signal data line data1 is controlled to be same as the duration during which the data signal terminal 40 transmits the second data signal to the second data line data2, the duration for the data signal terminal 40 to transmit the first data signal to the first data line data1 and the duration for the data signal terminal 40 to transmit the second data signal to the second data line data2 may be maximized. Accordingly, the display effect may be improved.

It can be understood that, as shown in FIGS. 1-3, the first control signal on the first control signal line MUX1 and the first scan signal on the first scan line SA may be both at the on-level, when the second control signal on the signal line MUX2 and the second scan signal on the second scan line SB are both at the off-level, the first switch K1 and the first data writing module 101 in the first pixel circuit 10 of the first row may all be turned on, the second switch K2 and the second data writing module 201 in the second pixel circuit 20 of the first row may both be turned off, the first data signal from the data signal terminal 40 may be transmitted to the first driving module 102 of the first pixel circuit 10 in the first row through the first switch K1 and the first data line data1.

When the first control signal on the first control signal line MUX1 is at an off-level, and the first scanning signal on the first scan line SA, the second scan signal on the second scan line SB, and the second control signals on the second control signal line MUX2 are all at the on-level, the first switch K1 may be turned off, the second switch K2, the first data writing module 101 of the first pixel circuit 10 of the first row and the second data writing modules 201 of the second pixel circuit 20 of the first row may all be turned on, and the second data signal from the data signal terminal 40 may be transmitted to second driving module 202 in the second pixel circuit 20 of the first row through the second switch K2 and the second data line data2. At this time, the first data signal on the first data line data1 may still be written into the first driving module 102 in the first pixel circuit 10 of the first row, the writing time in the first driving module 102 of the first pixel circuit 10 in the first row may be increased and the charging time of the first pixel circuit 10 in the first row may be increased, which may be conducive to improving or solving the short charging time of the first pixel circuit 10 in the first row, resulting in the insufficiently charged of first pixel circuit 10 in the first row and the display effect of the display panel needs to be improved. Accordingly, the display effect of the display panel may be improved.

The first control signal on the first control signal line MUX1, the first scan signal on the first scan line SA, and the second scan signal on the second scan line SB may all be at the on-level, when the second control signal on the second control signal line MUX2 is at the off-level, the first switch K1, the second switch K2, the first data writing module 101 of the first pixel circuit 10 in the second row, and the second data writing module 201 of the second pixel circuit 20 in the second row may all be turned on, the second switch K2 may be turned off, the first data signal from the data signal terminal 40 may be transmitted to the first driving module 102 of the first pixel circuit 10 of the second row through the first switch K and the first data line data1. At this time, the second data signal on the second data line data2 may still be written into the second driving module 202 of the second pixel circuit 20 in the first row, increasing the duration of the second signal in the second driving module 202 of the second pixel circuit 20 in the first row, which may be conducive to solving the short charging time of the second pixel circuit 20 in the first row, and the display effect of the display panel may be improved.

When the first control signal on the first control signal line MUX1 is at an off-level, and the first scan signal on the first scan line SA, the second scan signal on the second scan line SB, and the second control signals on the second control signal line MUX2 are all at the on-level, the first switch K1 may be turned off, the second switch K2, the first data writing module 101 of the first pixel circuit 10 in the second row and the second data writing modules 201 of the second pixel circuit 20 in the second row may all be turned on, and the second data signal from the data signal terminal 40 may be transmitted to the second data writing module 201 of the second pixel circuit 20 in the second row through the second switch K2 and the second data line data2. At this time, the first data signal on the first data line data1 may still be written into the first driving module 102 of the first pixel circuit 10 in the second row, extending the writing time of the first data signal in the first driving module 102 of the first pixel circuit 10 in the second row, for example, the charging time of the first pixel circuit 10 in the second row may be increased, which may be conducive to improving or solving the short charging time of the first pixel circuit 10 in the second row, resulting in insufficient charge of the first pixel circuit 10 in the second row. Accordingly, the display effect of the display panel may be improved.

Figure 5:
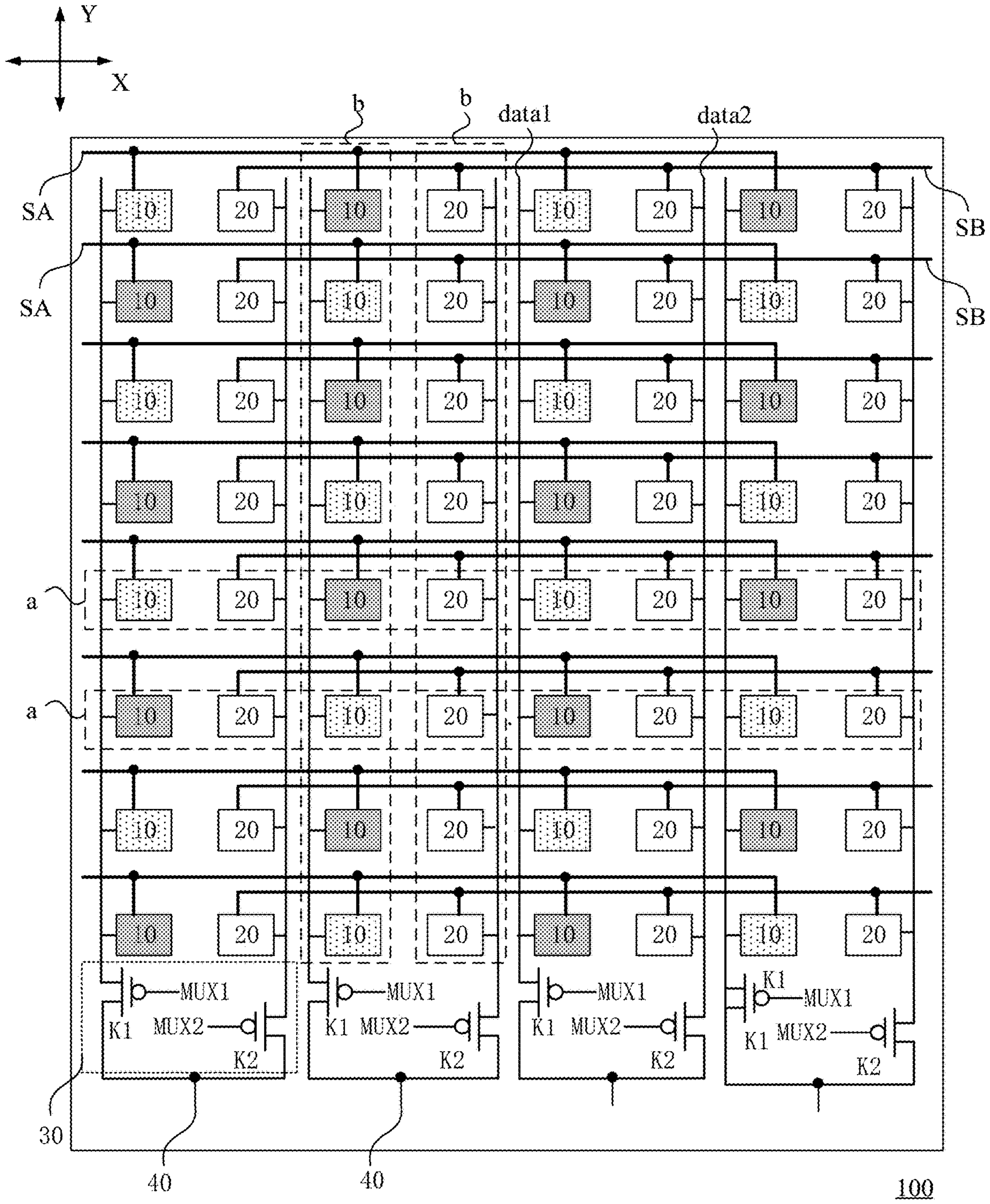
FIG. 5 illustrates another exemplary display panel according to various disclosed embodiments of the present disclosure.

In other embodiments, as shown in FIG. 5, for the m-th column pixel circuit column b, the first pixel circuit 10 in the odd-numbered row may be used to drive the red light-emitting element, and the first pixel circuit 10 in the even-numbered row may be used to drive blue light-emitting elements. For the (2m+1)-th pixel circuit column b, the first pixel circuit 10 in the odd-numbered row may be used to drive the blue light-emitting element, and the first pixel circuit 10 in the even-numbered row may be used to drive the red light-emitting element. For the 2m-th column and the (2m+2)-th column pixel circuit column b, the second pixel circuit 20 may be used to drive the green light-emitting element. m may be a positive integer.

In other words, for the odd-numbered pixel circuit row a, the first pixel circuit 10 for driving the red light-emitting element, the second pixel circuit 20 for driving the green light-emitting element, and the first pixel circuit 10 for driving the blue light-emitting element and the second pixel circuit 20 for driving the green light-emitting element may be alternately arranged in the row direction X. For the even-numbered pixel circuit row a, the first pixel circuit 10 for driving the blue light-emitting element, the second pixel circuit 20 for driving the green light-emitting element, the first pixel circuit for driving the red light-emitting element 10, and the second pixel circuit 20 for driving green light-emitting elements may be arranged alternately in the row direction X.

Figure 6:
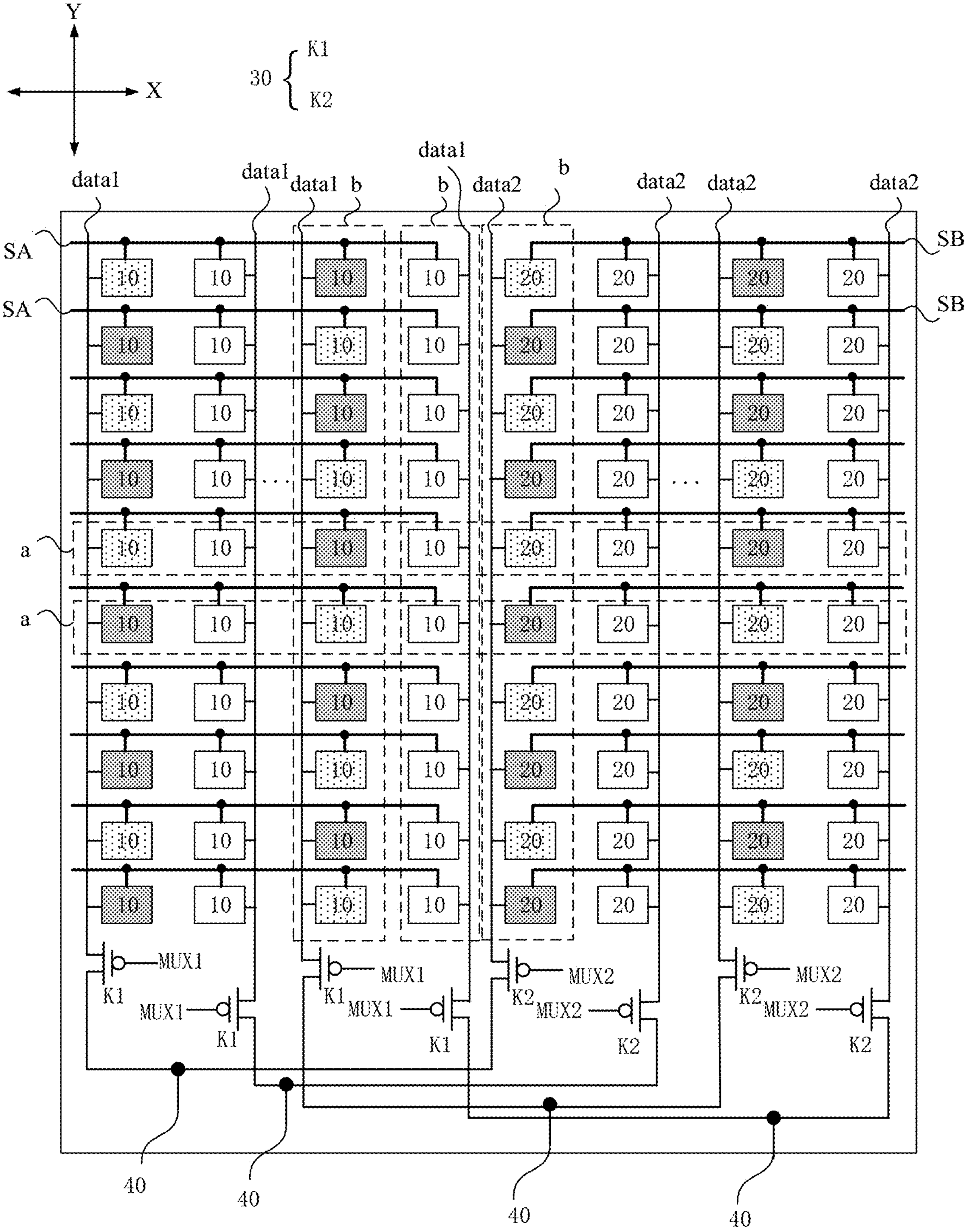
FIG. 6 illustrates another exemplary display panel according to various disclosed embodiments of the present disclosure.

In some embodiments, as shown in FIG. 6, each pixel circuit row a may include a number p of pixel circuits. The first pixel circuits 10 may include the 1st to q-th pixel circuits, and the second pixel circuits 20 may include the (q+1)-th pixel circuit to p-th pixel circuit. Both p and q may be positive integers, and q may be less than p.

For example, the c-th first pixel circuit 10 in the odd-numbered columns from the 1st to q-th columns may be used to drive the light-emitting element of the first color to emit light, and the (c+1)-th first pixel circuit 10 in the odd-numbered columns from the 1st to q-th columns may be configured to drive the light-emitting elements of the second color to emit light, and the first pixel circuits 10 in the even-numbered columns from the first column to the q-th column may be configured to drive the light-emitting elements of the third color to emit light. The d-th second pixel circuit 20 in the odd-numbered column from (q+1)-th column to p-th column may be configured to drive the light-emitting element of the first color to emit light, and the (d+1)-th second pixel circuit 20 in the odd-numbered column from (q+1)-th column to the p-th column may be configured to drive the light-emitting elements of the second color to emit light, and the second pixel circuits 20 in the even-numbered columns from the (q+1)-th column to the p-th column may be configured to drive the light-emitting elements of the third color to emit light. c and d may be both positive integers, c may be equal to d, or c may not be equal to d. In one embodiment, the first color may be red, the second color may be blue, and the third color may be green.

It should be noted that the arrangement of the first pixel circuit 10 and the second pixel circuit 20 shown in FIGS. 1, FIG. 5 and FIG. 6 is only used as an example and is not intended to limit the present disclosure.

In some embodiments, t1 #t2. In other embodiments, t1=H, or t2-H.

Figure 7:
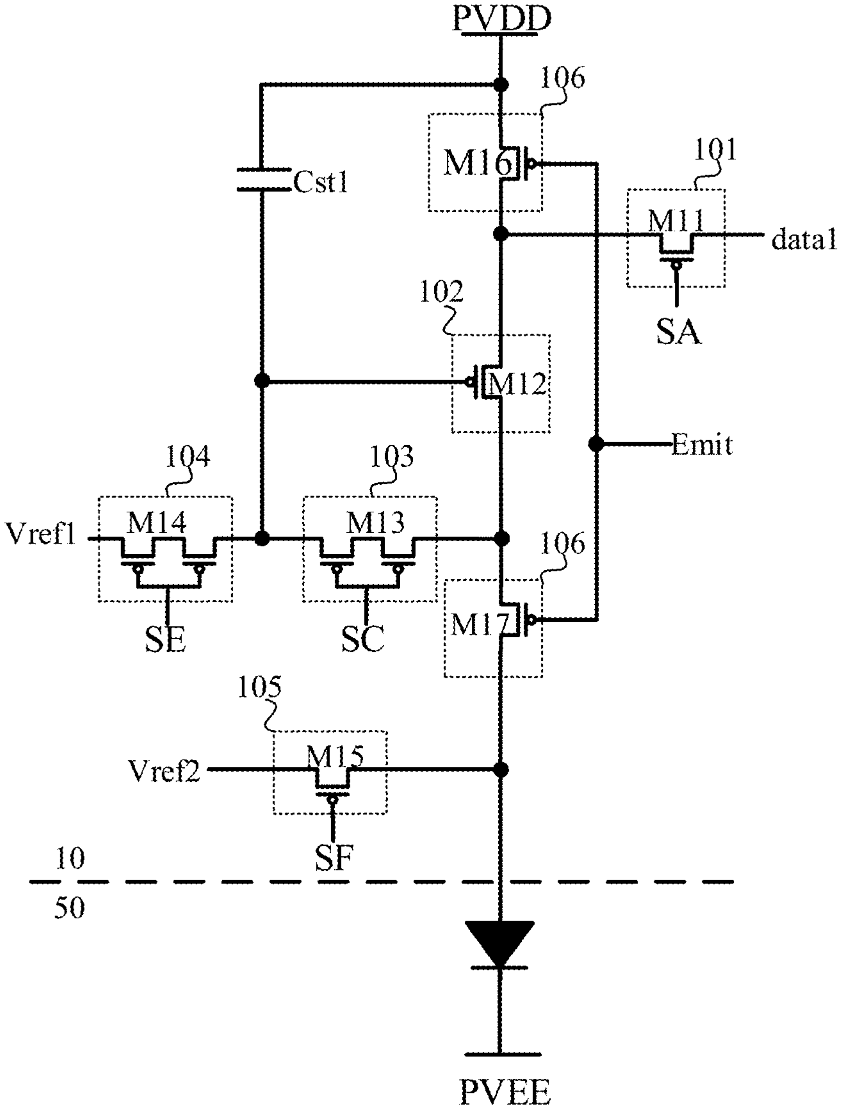
FIG. 7 illustrates another first pixel circuit of an exemplary display panel according to various disclosed embodiments of the present disclosure.
Figure 8:
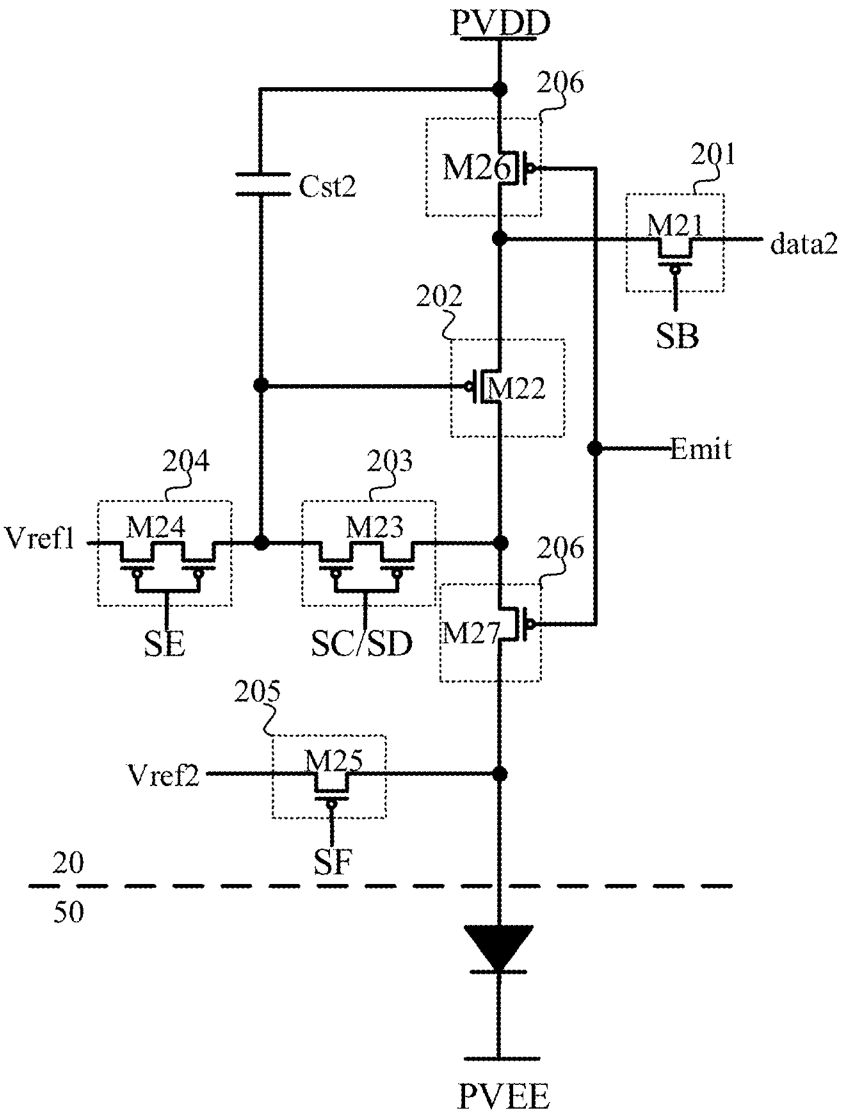
FIG. 8 illustrates another second pixel circuit of an exemplary display panel according to various disclosed embodiments of the present disclosure.

In other embodiments, as shown in FIGS. 7-8, the first threshold compensation module 103 of the first pixel circuit 10 may be electrically connected to the third scan line SC, and the second threshold compensation module 203 of the second pixel circuit 20 may be electrically connected to the fourth scan line SD. Accordingly, the first threshold compensation module 103 and the second threshold compensation module 203 may be independently controlled to be turned on or off.

In the case where the first threshold compensation module 103 of the first pixel circuit 10 may be electrically connected to the third scan line SC, and the second threshold compensation module 203 of the second pixel circuit 20 may be electrically connected to the fourth scan line SD, the duration during which the third scan signal on the third scan line SC is at the on-level may cover the duration during which the first scan signal on the first scan line SA is at the on-level, and the duration during which the fourth scan signal on the fourth scan line SD is at the on-level may cover the duration during which the second scan signal on the second scan line SB may be at the on-level. In such a way, the first pixel circuit 10 and the second pixel circuit 20 may realize the data writing and threshold compensation at the same time.

In some other embodiments, the duration during which the second scan signal on the second scan line SB is at the on-level may sequentially cover the duration during which the second control signal on the second control signal line MUX2 is at the on-level, and the duration during which the first control signal on the first control signal line MUX1 is at the on-level. It should be noted that in this embodiment, the second control signal and the first control signal may be at the on-level in sequence.

FIG. 7 illustrates another first pixel circuit of an exemplary display panel according to various disclosed embodiments. Referring to FIG. 2 and the FIG. 7, the major differences between FIG. 2 and FIG. 7 may include that the first pixel circuit 10 in FIG. 2 may include a first bias module 107, and the first pixel circuit 10 in FIG. 7 may not include a first bias module, and the first reset module 104 and the first threshold compensation module 103 in FIG. 2 may both include N-type transistors, and the first reset module 104 and the first threshold compensation module 103 in FIG. 7 may both include P-type transistors.

FIG. 8 illustrates another second pixel circuit of an exemplary display panel according to various disclosed embodiments of the present disclosure. Referring to FIG. 3 and FIG. 8, the differences between FIG. 3 and FIG. 8 may include that the second pixel circuit 20 in FIG. 3 may include a second bias module 207, and the second pixel circuit 20 in FIG. 8 may not include a second bias module, and the third reset module 204 and the second threshold compensation module 203 in FIG. 3 may both include N-type transistors, and the third reset module 204 and the second threshold compensation module 203 in FIG. 8 may both include P-type transistors.

Figure 9:
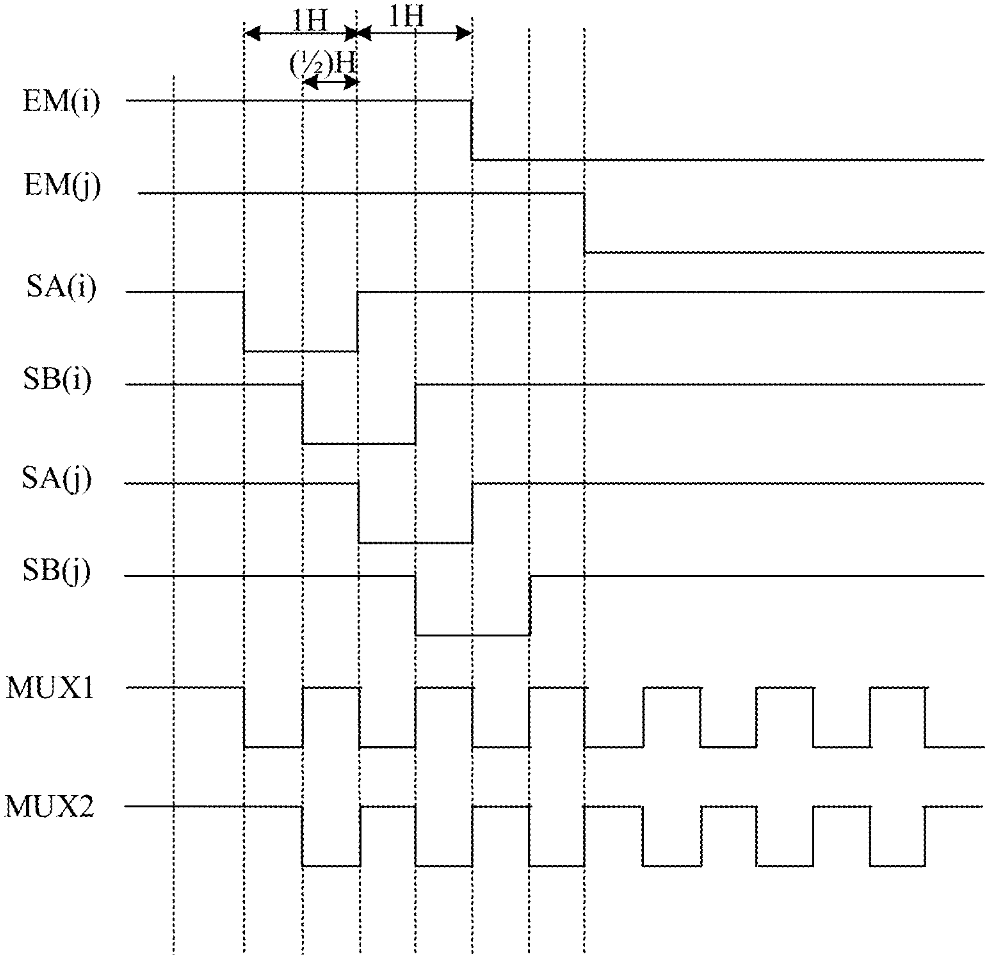
FIG. 9 illustrates another time sequence of an exemplary display panel according to various disclosed embodiments of the present disclosure.

In some embodiments, referring to FIGS. 2-3 and FIG. 9, the i-th pixel circuit row a may be electrically connected to the i-th first scan line SA(i) and the i-th second scan line SB(i); and the j-th pixel circuit row a may be electrically connected to the j-th first scanning line SA(j) and the j-th second scanning line SB(j). Scan signals on the i-th first scan line SA(i), the i-th second scan line SB(i), the j-th first scan line SA(j), and the j-th second scan line SB(j) may be all at the on-level in sequence. The duration during which the second scan signal on the i-th second scan line SB(i) is at the on-level may at least partially overlap with the duration during which the first scan signal on the j-th first scan line SA(j) is at the on-level. i≠j, and both i and j are positive integers.

In one embodiment, by setting the duration during which the second scan signal on the i-th second scan line SB(i) is at the on-level and the duration during which the first scan signal on the j-th first scan line SA(j) is at the on-level at least partially overlap, while the first driving module 102 of the first pixel circuit 10 in the j-th row of pixel circuit row a writes the first data signal, the second driving module 202 of the second pixel circuit 20 in the i-th row of pixel circuit row a may also write the second data signal. Compared with the configuration that when the first driving module of the first pixel circuit in the j-th row pixel circuit row writes the first data signal, but the second driving module of the second pixel circuit in the i-th row pixel circuit row a does not write the second data signal, the charging time of the second pixel circuit 20 in the i-th row of pixel circuit row a may be increased, which may be beneficial to improving or solving the problem that the charging of the second pixel circuit 20 in the i-th row of pixel circuit row a is too short, causing the second pixel circuit 20 to be insufficiently charged and the display effect of the display panel needs to be improved. Accordingly, the display effect of the display panel may be improved. It should be noted that the values of i and j may be set according to the actual situation and are not limited here.

In some embodiments, the first scan signal on the i-th first scan line SA(i) may not overlap with the first scan signal on the j-th first scan line SA(j). That is to say, the first driving module 102 of the first pixel circuit 10 in the i-th row of pixel circuit row a and the first driving module 102 of the first pixel circuit 10 in the j-th row of pixel circuit row a may not write the first data signal at the same time. For example, when the first driving module 102 of the first pixel circuit 10 in the i-th pixel circuit row a writes the first data signal, the first driving module 102 of the first pixel circuit 10 in the j-th pixel circuit row a may not write the first data signal; and when the first driving module 102 of the first pixel circuit 10 in the j-th row of pixel circuit row a writes the first data signal, the first driver module 102 of the first pixel circuit 10 in the i-th row of pixel circuit row a may not write the first data signal.

In some embodiments, the ending time at which the first scan signal on the i-th first scan line SA(i) becomes an on-level may be same as the starting time the first scan signal on the j-th first scan line SA(j) becomes an on-level. For example, when the first driving module 102 of the first pixel circuit 10 in the i-th row of pixel circuit row a stops writing the first data signal, the first driving module 102 of the first pixel circuit 10 in the j-th row of pixel circuit row a may start writing the first data signal.

In some embodiments, i and j may be adjacent. In some embodiments, j=i+1.

In some embodiments, the scanning signals on the i-th first scan line SA(i), the i-th second scan line SB(i), the j-th first scan line SA(j) and the j-th second scan line SB(j) may be sequentially spaced by (½)H of the on-level. H may be the row scan time of the display panel.

In such a configuration, while the second driving module 202 of the second pixel circuit 20 in the i-th pixel circuit row a writes the first data signal, the first driving module 102 of the first pixel circuit 10 in the i-th pixel circuit row a may also write the first data signal. Compared with the configuration that, while the second driving module of the second pixel circuit in the i-th pixel circuit row a writes the first data signal, but the first driving module of the first pixel circuit in the i-th pixel circuit row does not write the first data signal, the charging time of the first pixel circuit 10 in the i-th pixel circuit row a may be increased, which may be beneficial to improving or solving the problem of charging of the first pixel circuit 10 in the i-th row of pixel circuit row a being too short, causing the first pixel circuit 10 to be insufficiently charged and the display effect of the display panel may need to be improved. Thus, the display effect of the display panel may be improved.

In the same way, the charging time of the second pixel circuit 20 in the i-th row pixel circuit row a, the first pixel circuit 10 in the j-th row pixel circuit row a, and the second pixel circuit 20 in the j-th row pixel circuit row a may also be increased. Accordingly, the issue of the short charging time of the first pixel circuit 10 and the second pixel circuit 20 in the i-th row pixel circuit row a and the j-th row pixel circuit row a, resulting in the insufficient charged of the first pixel circuit 10 and the second pixel circuit 20 and the display effect of the display panel needs to be improved, may be solved. Accordingly, the display effect of the display panel may be improved. Further, it may be helpful to simplify the control sequence.

In one embodiment, the starting time of the on-level of the scan signal on the i-th first scan line SA(i) may be T1, and the ending time of the on-level of the scan signal on the i-th first scan line SA(i) may be T2. Accordingly, the starting time of the on-level of the scan signal on the i-th second scan line SB(i) may be T1+ (½) H, the ending time of the on-level of the scan signal on the i-th second scan line SB(i) may be T2+ (½) H, the starting time of the on-level of the scan signal on the j-th first scan line SA(j) may be T1+H, the ending time of the on-level of the j-th scan line SA(j) may be T2+H, the starting time of the on-level of the scan signal on the j-th second scan line SB(j) may be T1+ (3/2) H, and the ending time of the on-level of the scanning signal on the j-th second scanning line SB(j) may be T2+(3/2) H.

Figure 10:
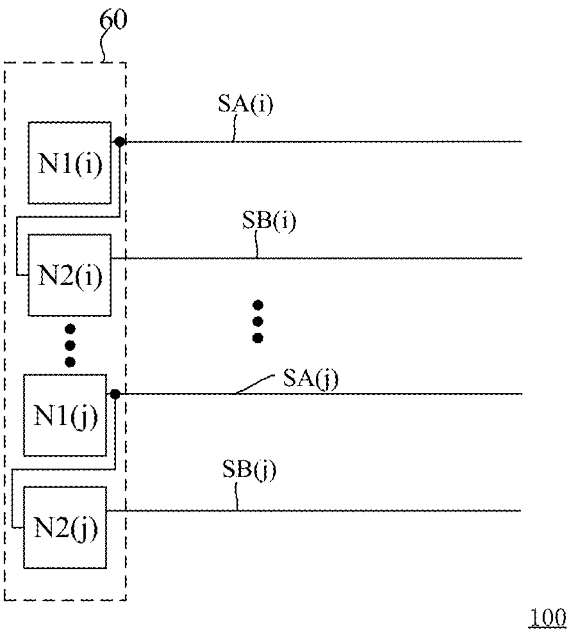
FIG. 10 illustrates a gate driving circuit of an exemplary display panel according to various disclosed embodiments of the present disclosure.

In some embodiments, as shown in FIG. 10, the display panel may further include a gate driving circuit 60. The gate driving circuit 60 may include a plurality of cascaded shift registers. The i-th first scan line SA(i), the i-th second scan line SB(i), the j-th first scan line SA(j) and the j-th second scan line SB(j) may be electrically connected to different shift registers of the same gate driving circuit 60.

In one embodiment, the i-th first scan line SA(i), the i-th second scan line SB(i), the j-th first scan line SA(j) and the j-th second scan line SB(j) may be electrically connected to different shift registers of the same gate driving circuit 60 such that different shift registers of the same gate driving circuit 60 may respectively provide different scan signals to the i-th first scan line SA(i), the i-th scan line SA(i), the i-th second scan lines SB(i), the j-th first scan line SA(j) and the j-th second scan line SB(j).

In one embodiment, the plurality of cascaded shift registers may include a shift register N1(*i*), a shift register N2(*i*), a shift register N1(*j*), and a shift register N2(*j*). The shift register N1(*i*) may be electrically connected to the i-th first scan line SA(i), the shift register N2(*i*) may be electrically connected to the i-th second scan line SB(i), the shift register N1(*j*) may be electrically connected to the j-th second scan line SA(j), and the shift register N2(*j*) may be electrically connected to the j-th second scan line SB(j).

Figure 11:
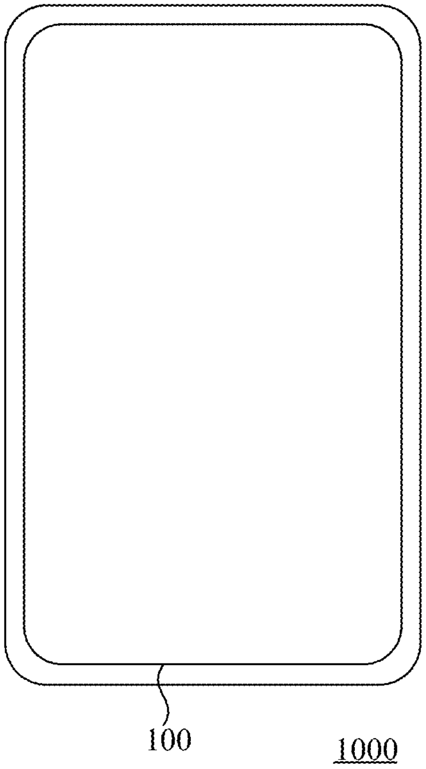
FIG. 11 illustrates an exemplary display device according to various disclosed embodiments of the present disclosure.

The present disclosure also provides a display device. The display device may include a presently disclosed display panel provided by. FIG. 11 illustrates an exemplary display device according to various disclosed embodiments of the present disclosure.

As shown in FIG. 11, the display device 1000 may include the display panel 100 provided by any of the above embodiments of the present disclosure. FIG. 11 only uses a mobile phone as an example to illustrate the display device 1000. It can be understood that the display device provided by the embodiment of the present disclosure may be a wearable product, a computer, a television, a vehicle-mounted display device, or other devices with display functions. The display device is not specifically limited in this disclosure. The display device provided by the embodiments of the present disclosure may have the beneficial effects of the display panel provided by the embodiments of the present disclosure. The details may be referred to the specific descriptions of the display panels in the above embodiments, which will not be described again.

According to the display panel and display device provided by the embodiments of the present disclosure, the first pixel circuit may be electrically connected to the first scan line, and the second pixel circuit may be electrically connected to the second scan line. Thus, the time for writing the first data signal on the first data line to the first pixel circuit and the time for writing the second data signal on the second data line to the second pixel circuit may be flexibly controlled. That is to say, by adding a new scan line, the charging time of the first pixel circuit and the second pixel circuit may be controlled independently, and the charging time of the first pixel circuit and/or the second pixel circuit may be flexibly controlled, which may beneficial to increasing the charging time of the first pixel circuit and/or the second pixel circuit. Accordingly, the issue that the first pixel circuit and/or the second pixel circuit are not insufficiently charged due to the short charging time of the first pixel circuit and/or the second pixel circuit may be solved; and the display effect of the display panel mya be improved.

According to the above-described embodiments of the present disclosure, these embodiments do not exhaustively describe all the details, nor do they limit the application to the specific embodiments described. Obviously, many modifications and variations are possible in light of the above description. This specification selects and specifically describes these embodiments to better explain the principles and practical applications of the present disclosure such that those skilled in the art may make good use m, of the present disclosure and make modifications based on the present disclosure. This disclosure is limited only by the claims and their full scope and equivalents.

What is claimed is:

1. A display panel, comprising:

a plurality of pixel circuit rows and a plurality of pixel circuit columns arranged as an array, wherein:

each of the plurality of pixel circuit rows includes a first pixel circuit and a second pixel circuit, the first pixel circuit is electrically connected to a first scan line and the second pixel circuit is electrically connected to a second scan line;

first pixel circuits in a same column of the plurality of pixel circuit columns are electrically connected to the first data line, and second pixel circuits in a same column of the plurality of pixel circuit columns are electrically connected to the second data line; and a first scan signal on the first scan line is configured to control whether a first data signal on the first data line is written to the first pixel circuit, and a second scan signal on the second scan line is configured to control whether a second data signal on the second data line is written to the second pixel circuit.

2. The display panel according to claim 1, further comprising:

a gating circuit including a first switch and a second switch, wherein a first terminal of the first switch and a first terminal of the second switch are both electrically connected to a same data signal terminal, a second terminal of the first switch is electrically connected to the first data line, a second terminal of the second switch is electrically connected to the second data line, and the first data line is adjacent to the second data line.

3. The display panel according to claim 1, wherein:

the first pixel circuit and the second pixel circuit in the same pixel row are adjacent to each other.

4. The display panel according to claim 1, wherein:

an n-th first pixel circuit in a same pixel column is configured to drive a light-emitting element of a first color;

an (n+1)-th first pixel circuit in the same column is configured to drive a light-emitting element of a second color;

the second pixel circuit is configured to drive a light-emitting element of a third color; and n is a positive integer.

5. The display panel according to claim 1, wherein:

a duration during which the first scan signal on the first scan line is at an on-level at least partially overlaps a duration during which the second signal of the second scan line is at an on-level.

6. The display panel according to claim 5, wherein:

the duration during which the first scan signal on the first scan line is at the on-level is $t1$;

the duration during which the second signal of the second scan line is at the on-level is $t2$;

$(1/2)\ H<t1\leq H$ and/or $(1/2)\ H<t2\leq H$; and

H is a row scan time of the display panel.

7. The display panel according to claim 6, wherein:

$t1=t2$.

8. The display panel according to claim 6, wherein:

an overlap duration between the first signal on the first signal line and the second signal on the second signal line is $t3$;

$t3=(1/2)\ H$; and $t1=t2=H$.

9. The display panel according to claim 5, wherein:

an i-th pixel circuit row is electrically connected to an i-th first scan line and an i-th second scan line;

a j-th pixel circuit row is electrically connected to a j-th first scan line and a j-th second scan line;

scan signals of the i-th first scan line, the i-th second scan line, the j-th first scan line, and the j-th second scan line are at the on-level in sequence;

a duration during which the second scan signal on the i-th second scan line is at the on-level at least partially overlaps a duration during which the first scan signal on the j-th first scan line is at the on-level; and $i\neq j$, and both i and j are positive integers.

10. The display panel according to claim 9, wherein:

the first scan signal on the i-th first scan line does not overlap and the first scan signal on the j-th first scan line.

11. The display panel according to claim 9, wherein:

an ending time when the first scan signal on the i-th first scan line is at the on-level is same as a starting time when the first scan signal on the j-th first scan line is at the on-level.

12. The display panel according to claim 9, wherein:

i is adjacent to j.

13. The display panel according to claim 9, wherein:

scan signals on the i-th first scan line, the i-th second scan line, the j-th first scan line, and the j-th second scan line are at the on-level sequentially spaced by $(1/2)$ H; and H is a row scan time of the display panel.

14. The display panel according to claim 1, wherein:

a first threshold compensation module of the first pixel circuit and a second threshold compensation module of the second pixel circuit are both electrically connected to a third scan line.

15. The display panel according to claim 14, wherein:

a duration during which the third scan signal on the third scan line is at the on-level covers the duration during which the first scan signal on the first scan line is at the on-level, and covers the duration during which the second scan signal on the second scan signal line is at the on-level.

16. The display panel according to claim 2, wherein:

the gating circuit is electrically connected to a first control signal line and a second control signal line, the first control signal line is configured to control whether the first data signal from the data signal terminal is written into the first data line, and the second control signal line is configured to control whether the second data signal from the data signal terminal is written to the second data line;

a duration during which the first scan signal on the first scan line is at the on-level and a duration during which the first control signal on the first control signal line is at the on-level at least partially overlap; and/or a duration during which the second scan signal on the second scan line is at the on-level and a duration during which the second control signal on the second control signal line is at the on-level at least partially overlap.

17. The display panel according to claim 16, wherein:

the duration during which the first scan signal on the first scan line is at the on-level covers the duration during which the first control signal on the first control signal line and covers the duration during which the second control signal on the second control signal line is at the on-level.

18. The display panel according to claim 16, wherein:

the duration during which the first scan signal on the first scan line is at the on-level is equal to the duration during which the second control signal on the second control signal line is at the on-level.

19. The display panel according to claim 18, wherein:

the duration during which the first control signal on the first control signal line is at the on-level is t4;

the duration during which the second control signal on the second control signal line is at the on-level is t5;

t4=t5=(½) H; and

H is a row scan time of the display panel.

20. A display device, comprising:

a display panel, including:

a plurality of pixel circuit rows and a plurality of pixel circuit columns arranged as an array, wherein:

each of the plurality of pixel circuit rows includes a first pixel circuit and a second pixel circuit, the first pixel circuit is electrically connected to a first scan line and the second pixel circuit is electrically connected to a second scan line;

first pixel circuits in a same column of the plurality of pixel circuit columns are electrically connected to the first data line, and second pixel circuits in a same column of the plurality of pixel circuit columns are electrically connected to the second data line; and a first scan signal on the first scan line is configured to control whether a first data signal on the first data line is written to the first pixel circuit, and a second scan signal on the second scan line is configured to control whether a second data signal on the second data line is written to the second pixel circuit.

* * * * *